Nov. 11, 1952     E. B. MILLER     2,617,718
CATALYTIC REACTOR
Original Filed March 12, 1951     2 SHEETS—SHEET 1
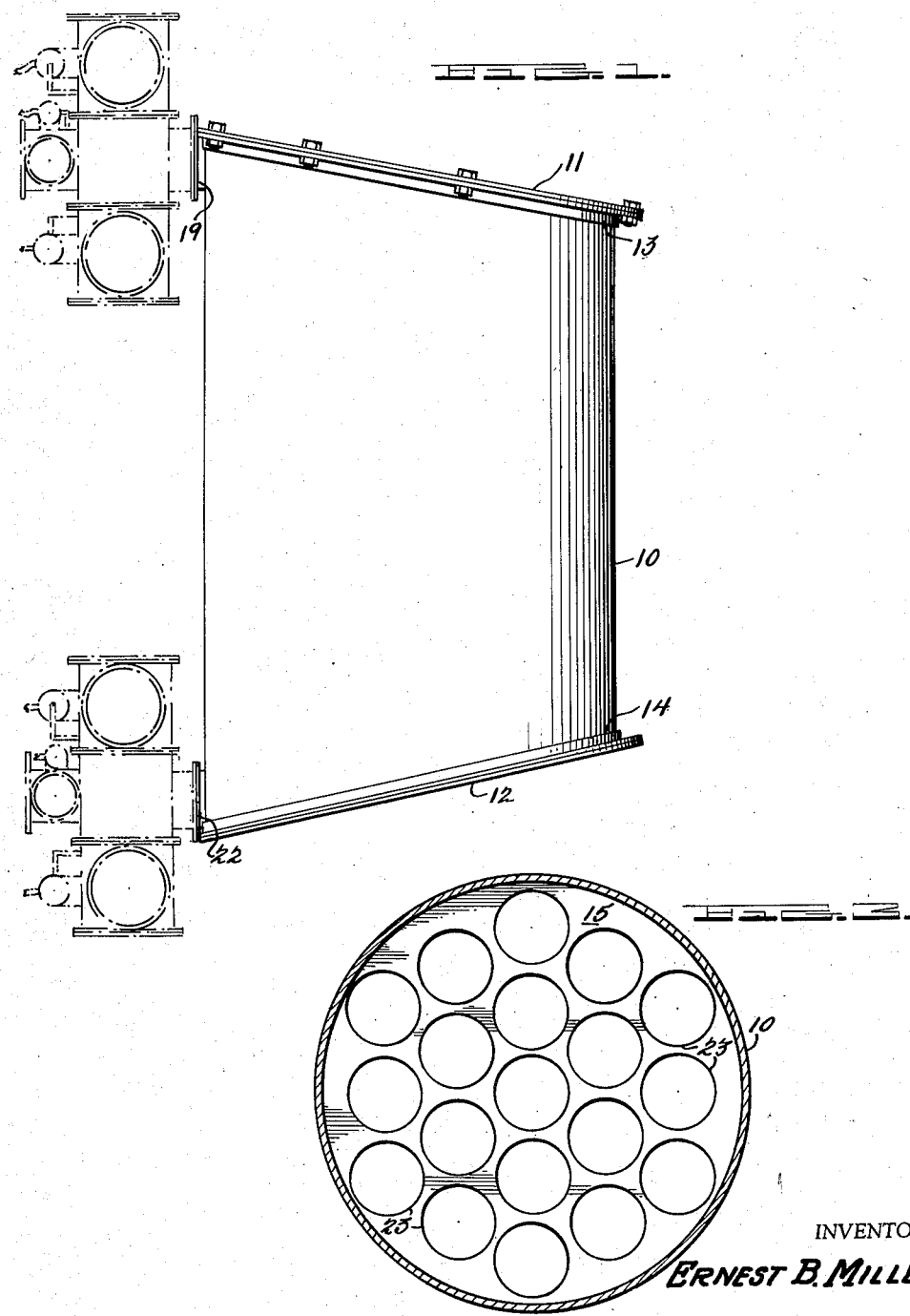
INVENTOR
*ERNEST B. MILLER*
BY *Adams & Bush*
ATTORNEYS Nov. 11, 1952   E. B. MILLER   2,617,718
CATALYTIC REACTOR
Original Filed March 12, 1951   2 SHEETS—SHEET 2
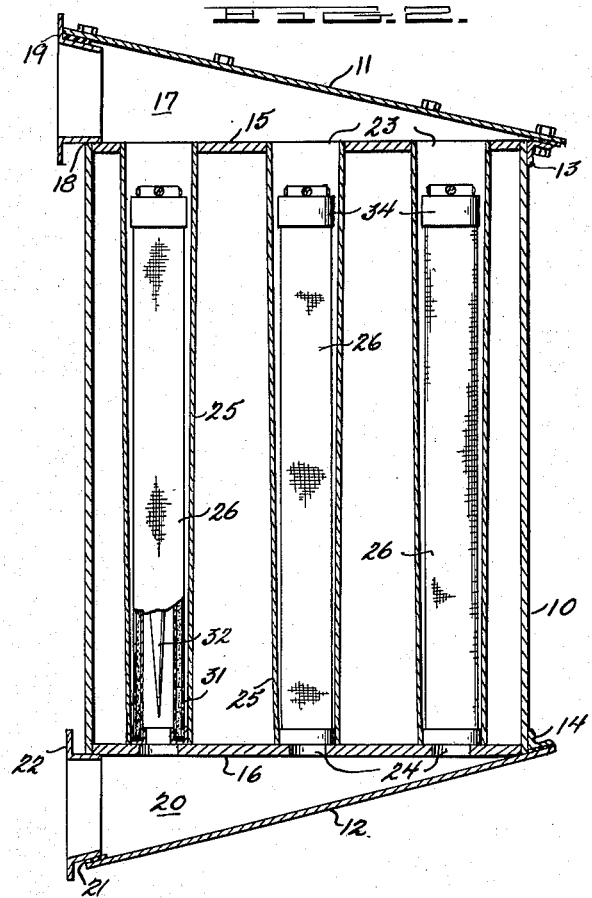
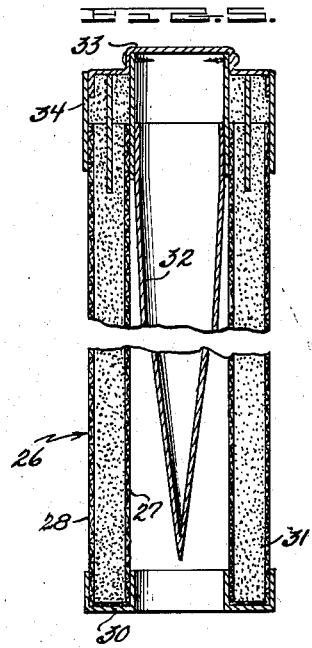
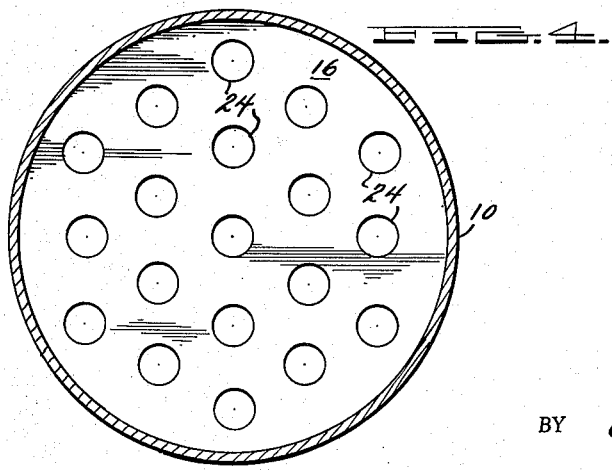
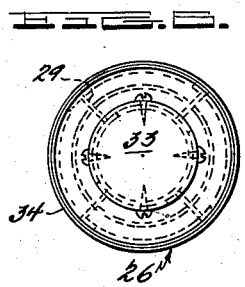
INVENTOR
ERNEST B. MILLER
BY Adams & Bush
ATTORNEYS Patented Nov. 11, 1952

2,617,718

UNITED STATES PATENT OFFICE 2,617,718
CATALYTIC REACTOR

Ernest B. Miller, Houston, Tex., assignor to Jefferson Lake Sulphur Company, New Orleans, La., a corporation of New Jersey Original application March 12, 1951, Serial No. 215,178. Divided and this application March 12, 1951, Serial No. 215,179

5 Claims. (Cl. 23—288)

This invention relates to apparatus for treating fluids and has more particular reference to reactors for the catalytic treatment of gases.

One object of the present invention is to provide an improved reactor of the stationary type, in which a plurality of foraminous containers adapted to hold a granular catalyst material are mounted, and having inlet and outlet openings to permit the flow of fluids therethrough, whereby the fluids will come into intimate contact with the catalyst contained therein.

Another object of the present invention is to provide a reactor, as characterized above, in which a large surface area of relatively thin beds of catalyst, offering a minimum of resistance to the flow of the fluids, is condensed into a small cubic space.

Another object of the invention is to provide a reactor, as above characterized, in which baffle members are provided to insure an even flow of the fluids through the catalyst material, thereby making effective use of all of the treating material and increasing the efficiency and capacity of the apparatus.

A further object of the invention is to provide a reactor, as characterized above, in which the foraminous containers may readily be removed and replaced.

Other objects and advantages of the invention will appear in the following specification when considered in connection with the accompanying drawings, wherein:

Fig. 1 is a side elevational view of a reactor constructed in accordance with the present invention and showing the manner in which it is connected to the upper and lower headers;

Fig. 2 is a vertical sectional view of the reactor shown in Fig. 1;

Fig. 3 is a sectional view taken on the line 3—3 of Fig. 2;

Fig. 4 is a sectional view taken on the line 4—4 of Fig. 2;

Fig. 5 is a vertical sectional view of a tubular container; and

Fig. 6 is a plan view of the container shown in Fig. 5.

This application is a division of my co-pending application, Ser. No. 215,178, filed March 12, 1951, for Method of and Apparatus for the Recovery of Elemental Sulphur in Liquid Form from Gases Containing Hydrogen Sulphide, and the Conversion of the Liquid Sulphur into Solidified Flakes.

The aforesaid co-pending parent application involves a system for recovering, in flake form, elemental sulphur from gases containing hydrogen sulphide.

The system includes a plurality of reactors for reacting the gas to be treated to form elemental sulphur vapor which is condensed in scrubbing towers.

The present invention is drawn to the particular construction and arrangement of the novel reactor and its appurtenances, as disclosed in said parent application.

Referring now to the drawings, there is shown a reactor constructed in accordance with the present invention and comprising a cylindrical tank 10 having a rearwardly and downwardly sloping flat top wall 11 and a rearwardly and upwardly sloping flat bottom wall 12.

The top and bottom wall members 11 and 12 are elliptical in outline and are secured, as by bolting, to flange members 13 and 14, respectively, which, in turn, are secured, as by bolting, to the upper and lower peripheries of the cylindrical tank 10. A vertically spaced pair of disc-shaped plates 15, 16, are mounted in the tank 10 with their peripheral edges secured to the wall of the tank, as by welding, to form a gas-tight joint.

The top wall member 11, the upper disc member 15, and the portion of the side wall of the tank therebetween form an upper manifold 17. An opening 18 is formed in the front wall of the upper manifold and an upper flanged connecting fitting or nipple 19 is secured thereon, as by welding the inner edges of the rectangular box-like fitting to the edges of the opening 18. The bottom wall member 12, the lower disc member 16, and the portion of the side wall of the tank therebetween form a lower manifold 20. An opening 21 is formed in the front wall of the lower manifold and a lower flanged connecting fitting or nipple 22 is secured thereon, as by welding the inner edges of the rectangular box-like fitting to the edges of the opening 21. The upper disc-shaped member 15 has a plurality of circular openings 23 formed therein, and the lower disc-shaped member 16 has a corresponding number of circular openings 24 formed therein. The openings 23 and 24 in the two disc-shaped members are in vertical alignment, but the openings in the bottom disc-shaped member are of less diameter than the openings in the upper disc-shaped member. A tapered tubular baffle member or conduit 25, preferably made of sheet metal, extends between each circular opening in the upper disc-shaped member and the corresponding aligned opening in the lower disc-shaped member, with its upper end secured to the peripheral edge of the opening in the upper disc-shaped member and its bottom edge secured to the lower disc-shaped member around the circular opening therein (see Fig. 2).

Mounted within each of the conduits 25 is a tubular catalyst container 26. The catalyst containers 26 are identical in construction and, as best shown in Figs. 5 and 6, each comprises two concentric tubular screens 27, 28 held in spaced apart relation by a plurality of longitudinal radial fins 29, with the annular space between the screens closed at the bottom, as by a flanged annular plate 30. The mesh of the screens is such as to retain a granular catalyst material 31 in the annular space between the screens.

Mounted within the inner wire screen 27 is an inverted substantially conically shaped baffle member 32. The baffle member is closed at its apex which extends downwardly to a point near the bottom of the container and has its upper peripheral edge suitably secured to the upper peripheral edge of the screen. Preferably, the baffle member is made of sheet metal. Each container is closed at its top, as by a cap member 33, connected to ring collars 34 secured to the upper end portion of the wire screens 27, 28.

It should be noted that the annular space between the inner wall of the baffle member or conduit 25 and the outer wall of the conical-shaped baffle member 32 forms an open-ended duct and that the annular bed of catalyst material forms a barrier extending longitudinally across the duct (see Fig. 2).

The diameter of the bases and the taper of the side walls of the baffle members 25 and 32 are such that the cross sectional area of the duct formed between the two members is substantially equal at its top and bottom. The tapers of the side walls of the two baffle members are such that a substantially uniform velocity is obtained on both sides of the barrier as fluid is transferred from the upstream side to the downstream side, regardless of the direction of flow, thereby creating a substantially constant static head over the face of the barrier, resulting in a substantially uniform distribution of the fluid through the entire barrier area. This construction insures a substantially uniform flow of fluid through the catalyst material in the annular members, whether the flow of fluid is downward or upward.

In connection with the foregoing, it should be noted that, due to the rearward and downward slope of the top wall member 11, relative to the horizontal upper disc-shaped member 15, and the rearward and upward slope of the bottom wall member 12, relative to the horizontal lower disc-shaped member 16, the cross sectional area of the upper and lower manifolds progressively decreases from their entrance openings at their fronts to their rear, thus insuring a uniform flow of gas through the annular spaces between the baffle members 25 and 32, whether the flow of fluid through the reactors be up or down. Also, due to the top wall member 11 being detachably secured to the tank, it may readily be removed to permit removal of the tubular catalyst containers for replacement or repair. It should be noted that the tubular containers are removably mounted in the tapered conduit members 25. The upper and lower flanged nipples 19 and 22 are adapted to be connected to suitable control damper fittings mounted in suitable upper and lower headers for selectively permitting the flow of fluids through the reactor. As illustrated, the upper and lower nipples are shown as connected to upper and lower multi-damper seat boxes of the type shown in my aforesaid co-pending application.

Obviously, the invention is not restricted to the particular embodiment thereof herein shown and described. Moreover, it is not indispensable that all of the features of the invention be used conjointly, since they may be employed advantageously in various combinations and sub-combinations.

What is claimed is:

1. A reactor of the class described comprising, in combination, an upright tank having top, bottom and side walls, said top wall sloping rearwardly and downwardly and said bottom wall sloping rearwardly and upwardly; a vertically spacer pair of transversely extending partitions mounted in said tank and forming with said top and bottom walls and the portion of the side walls therebetween upper and lower manifolds respectively; a plurality of conduits extending between said spaced partitions and providing communication between said upper and lower manifolds; and a foraminous container adapted to hold granular catalyst material mounted in each of said conduits; and nipple fittings connected to said upper and lower manifolds to permit the flow of fluids through said tank.

2. A reactor, as set forth in claim 1, wherein the top wall of said tank is removable and wherein the containers are removably mounted in their respective conduits, whereby they are readily removed and replaced.

3. A reactor, as set forth in claim 1, wherein said foraminous containers are cylindrical and have an annular cross section.

4. A reactor of the class described comprising an upright tank having top, bottom and side walls; a vertically spaced pair of transversely extending partitions mounted in said tank and forming a gas-tight joint with the walls thereof, the upper of said partitions being spaced from the top wall of said tank and forming with said top wall and the portion of the side walls therebetween an upper manifold, the lower of said partitions being spaced from the bottom wall of said tank and forming with said bottom wall and the portion of the side walls therebetween a lower manifold, said upper and lower manifolds having openings therein to provide inlet and outlet openings for the flow of fluids through said tank; a plurality of open-ended inverted, frusto-conically shaped baffle members mounted in said tank and extending between the upper and lower transverse partitions and providing fluid passages between the upper and lower manifolds; an elongated annular foraminous catalyst container mounted in each baffle member, said container being closed at its top and having its hollow interior at its bottom end opening into the bottom of the baffle member; an inverted conically-shaped baffle mounted in the hollow interior of the container with the base of the conically-shaped baffle secured to the container adjacent its top end and with the apex extending to a point adjacent its bottom end, the construction being such that the annular space between the baffle members forms an elongated inverted frusto-conically-shaped conduit annular in cross section with the container forming a barrier extending longitudinally across the conduit from the top to the bottom, and with the taper of the side walls of the conduit being such that the cross sectional area of the conduit on each side of the barrier varies so as to maintain a substantially constant velocity of the fluid on either side of the barrier throughout its extent regardless of the direction of flow of fluid in the conduit, resulting in uniform flow through the entire barrier area.

5. A reactor, as set forth in claim 4, wherein the upper wall of the tank slopes rearwardly and downwardly and the bottom wall of the tank slopes rearwardly and upwardly.

ERNEST B. MILLER.

No references cited.